United States Patent [19]

Tatarchuk et al.

[11] Patent Number: 5,102,745

[45] Date of Patent: * Apr. 7, 1992

[54] MIXED FIBER COMPOSITE STRUCTURES

[75] Inventors: Bruce J. Tatarchuk; Millard F. Rose; Aravamuthan Krishnagopalan, all of Auburn, Ala.

[73] Assignee: Auburn University, Ala.

[*] Notice: The portion of the term of this patent subsequent to Jan. 14, 2009 has been disclaimed.

[21] Appl. No.: 435,167

[22] Filed: Nov. 13, 1989

[51] Int. Cl.⁵ .................. B32B 5/00; B32B 15/14
[52] U.S. Cl. ................................................ 428/605
[58] Field of Search .............. 428/605, 607, 608; 204/11, 12, 27, 28

[56] References Cited

U.S. PATENT DOCUMENTS

| | | | |
|---|---|---|---|
| 1,934,643 | 11/1933 | Rafton | 204/21 |
| 2,616,165 | 11/1952 | Brennan | 428/605 |
| 3,127,668 | 4/1964 | Troy | 428/605 |
| 3,161,478 | 12/1964 | Chessin | 428/605 |
| 3,310,387 | 3/1967 | Sump et al. | 428/605 |
| 3,694,325 | 9/1972 | Katz et al. | 204/11 |
| 3,740,834 | 6/1973 | Douglass | 428/605 |
| 4,435,252 | 3/1984 | Kadija | 204/11 |
| 4,471,015 | 9/1984 | Ebneth et al. | 428/936 |
| 4,597,028 | 6/1986 | Yoshida et al. | 361/305 |
| 4,643,940 | 2/1987 | Shaw et al. | 428/308.4 |
| 4,874,677 | 10/1989 | Reiche et al. | 428/605 |
| 4,882,227 | 11/1989 | Iwase et al. | 428/407 |

FOREIGN PATENT DOCUMENTS

| | | | |
|---|---|---|---|
| 74263 | 3/1983 | European Pat. Off. | 428/608 |
| 821690 | 10/1959 | United Kingdom | 428/605 |
| 942513 | 11/1963 | United Kingdom | 428/605 |

OTHER PUBLICATIONS

A. G. Metcalfe et al., "Fiber Metallurgy", Metal Progress, Mar. 1955, pp. 81–84.
C. L. Kobrin, "Fiber Metals: A New Adventure in Engineering Materials", The Iron Age, Jan. 24, 1963, pp. 53–55.

Primary Examiner—John J. Zimmerman
Attorney, Agent, or Firm—Eugene I. Snyder

[57] ABSTRACT

A family of composites are characterized as a network of a first fiber and at least a second fiber, where at least the first fibers have a multiplicity of bonded junctions at their point of crossing. The largest class has metals as one or both of the fibers, although the second fiber can be of materials such as carbon, ceramics, and high surface area materials. The composites can be simply prepared and manifest enormous variation in such properties as void volume, pore size, and electrical properties generally.

8 Claims, 7 Drawing Sheets

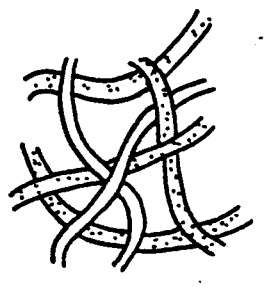
FIG. IA
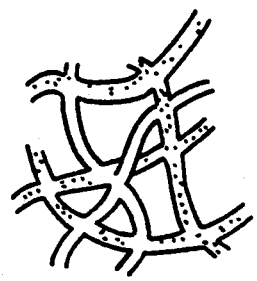
FIG. ID
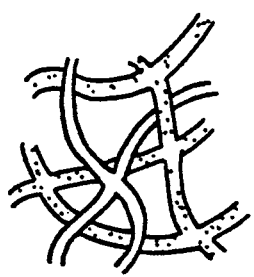
FIG. IC
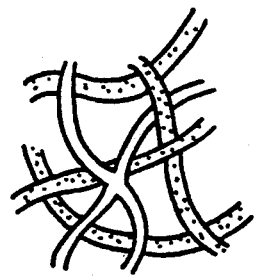
FIG. IB

FIG.6
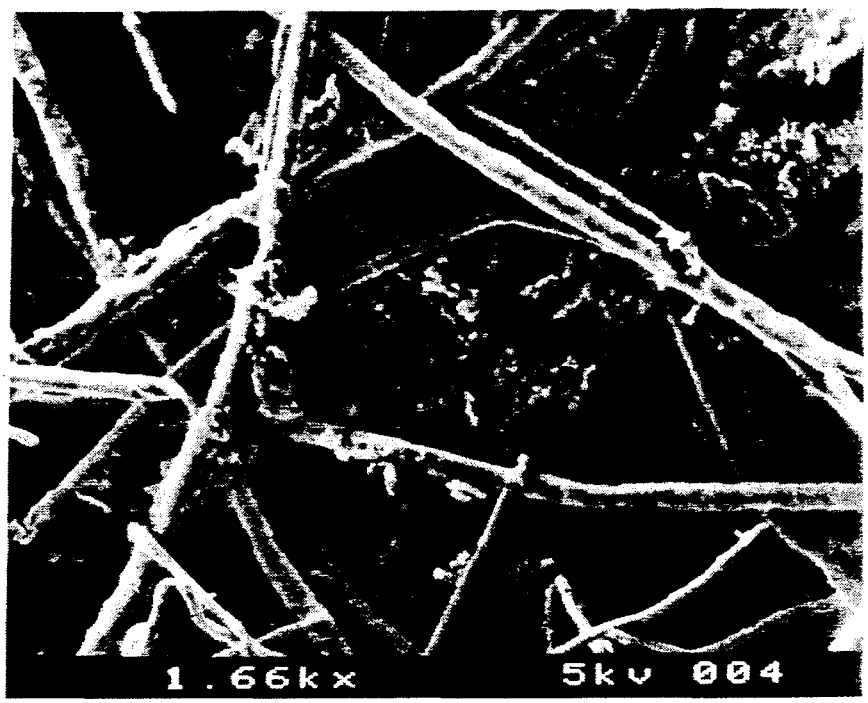
FIG.7
 
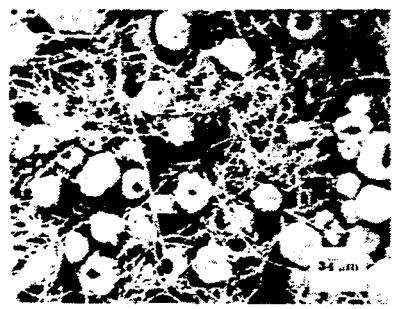 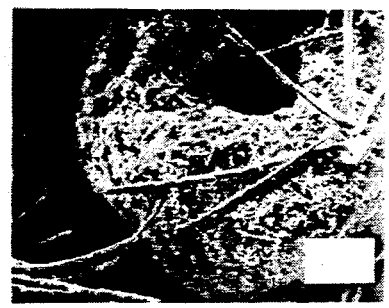

MIXED FIBER COMPOSITE STRUCTURES

ACKNOWLEDGMENTS

This work was funded by Auburn University and the Space Power Institute as funded by the SDIO Innovative Science and Technology Office and the Defense Nuclear Agency under DNA Contract No. 001-85-C-0183. This invention was made with Government support under the aforementioned contract, and the Government has certain rights in this invention.

BACKGROUND OF THE INVENTION

This application relates to novel composites capable of manifesting enormous variation in such properties as surface area, porosity, void volume, and conductivity, while displaying chemical stability in corrosive environments. The composites have mechanical and structural integrity and can be prepared in virtually an endless variety of shapes. For the sake of simplicity and clarity of exposition, the composites which are our invention will be discussed in this section largely from the aspect of their use as electrode materials. It needs to be stressed here that the claimed composites have significant utility outside the field of electrochemistry as will be later discussed in some detail. However, for the purpose of introducing the reader to our invention it appears better to first discuss a narrow but specific aspect prior to outlining its significantly broader features.

Carbon based electrodes are currently used in many high energy density and/or high power density applications, such as $Li/SOCl_2$ batteries, liquid double layer capacitors, and fuel cells. The maximum energy and power densities obtainable from these devices depend upon various physicochemical rate phenomena occurring at the electrode-electrolyte interface. For example, in the case of high energy density lithium/thionyl chloride batteries, deactivation of the carbon cathode limits operation of the battery at high ($>10$ $mA/cm^2$) discharge rates. Since deactivation arises from the preferential precipitation of solid reaction products at the exterior of the cathode, thereby blocking its interior from participating in the reaction, the power density of the battery during discharge is limited by the porosity, the void volume, and the active or accessible surface area of the carbon cathode.

As previously stated, the low solubility of cell reaction products at the cathode severely limits operation at high discharge rates when precipitates form at the exterior surface of the cathode, blocking its interior surface area from hosting products of the cell reaction. When the cathode becomes blocked, the interfacial electrochemical reaction of the anode becomes limited by the dissolution rate of the reaction products into the electrolyte, which in turn is controlled by the precipitation rate at the cathode. Attempts to improve the fabrication and design of the carbon cathode has had limited success. Much of this activity has involved the addition of metallic elements such as copper to the carbon or the coating of the cathodes with transition metal phthalocyanines. Other efforts have utilized various carbon pretreatment procedures or different types of carbon blacks with various physical properties. However, past attempts appear not to address the intrinsic problem associated with carbon blacks, viz., the inaccessibility of small pores within the microstructure of the material and the existence of low void volumes in the outermost layers of the carbon. To provide high power density cathodes materials are needed which are flexible, have high specific surface areas, have varying and adjustable porosities and void volumes to accommodate reaction products as precipitates without significant loss of surface area, and which are corrosion resistant.

In liquid double layer capacitors the energy density increases with increased active surface area of the electrode presented to the electrolyte. On the other hand, the power density is controlled and limited by slow diffusion of electrolyte through the microporous electrode material. The combined energy and power density of these capacitors is the resultant of increased diffusion processes, which prefer large pores and high void volumes, and higher levels of specific surface area, which require small pore sizes and low void volumes. To date the requirements of large pores/high void volume and high surface area tend to be mutually exclusive. Consequently, since increased energy density involves increased surface area and increased porosity, power dense devices become more and more limited by diffusion processes as the surface area of the electrode is increased.

In fuel cells, an effective electrode material should exhibit high catalytic activity and high electrical conductivity to minimize joule losses within the device. The electrode should be highly porous to provide free access to both the gases and the electrolytes. The optimum pore size distribution of the electrode material is a compromise between several factors. For high strength, low porosity and small pores are desirable. For low polarization, large pores with maximum internal surface area are more desirable. Electrodes also contain metals such as platinum, nickel, and so forth, which are good catalysts for fuel oxidation and oxidant reduction. The catalytic activity depends on the active surface area of electrode as well as the contacting of the electrode with reactants consisting of fuel and electrolyte. For this reason, controlled wetting of the electrode poses one of the more severe design limitations confronting the device in order to provide optimal contacting at the gas-liquid-catalyst interface in the absence of weeping, bubbling, and flooding.

Carbon is an especially attractive electrode material, and high surface area carbon electrodes typically are fabricated with carbon black. However, a major difficulty in fabricating and utilizing high surface area carbon electrodes has been in physically supporting the carbon. Carbon black usually is used in the powdered form which cannot be easily supported unless poly(tetrafluoroethylene) or other types of binders are used. Our radically different approach has been to combine dissimilar and normally incompatible materials to form a physically stable composite structure which exhibits properties intermediate to the constituent materials. In the context of carbon electrodes, the resulting materials have a high surface area, variable porosity and variable void volume, are structurally stable, and can be fabricated in a virtually endless variety of shapes and sizes. More particularly, high surface area carbon fibers and highly conductive metal fibers have been combined in an interwoven sinter-locked network or grid which is structurally stable. The resultant high surface area and conductive composite allows high accessibility to gases and electrolytes while providing adjustable porosities and void volumes. Interlocked networks of thin fibers can be bonded to metallic backings to provide flexible electrode structures which can be readily assembled into devices even when one of the components is relatively brittle or does not normally bond or adhere to the metal backing.

However useful and significant the fiber network of the foregoing paragraph may be, it seemed to us that it was but one example of a class of composites with a range of uses transcending those of electrochemical applications and encompassing such diverse areas as cellular supports in biochemical reactors, magnetic separators, and filters; a detailed exposition of these and other uses is deferred to a later section. As to the composites themselves, it appeared to us that one could specify their lowest common denominator, that is, those irreducible features which are necessary and sufficient to impart to the class of our composites those characteristics which made the class desirable from a materials point of view. A necessary feature is that the composite be a network of at least two different fibers. The fibers could be chemically different, for example, a metal fiber and a carbon fiber, or they could be physically different, for example, two fibers of the same metal but with different cross-sectional dimensions. The second and only necessary feature is that there be a number of points in the network where the fibers are physically connected, i.e., bonded. There is versatility and variability here, too, such as the relative number of bonded points, whether fibers "interbond" (i.e., bonding between dissimilar fibers), whether they only "intrabond" (i.e., bonding between similar fibers), and if there is intrabonding whether all classes of fibers so bond or whether only, say, one kind of fiber bonds.

A pictorial, somewhat fanciful, and certainly non-literal overview of our invention is depicted in FIG. 1. The left hand region, designated by A, represents a physical mixture of two kinds of fibers as shown by the open and dotted strands. The case where only one of these fibers is intrabonded is depicted by B, that where both kinds of fibers are intrabonded is depicted by C, and that where the fibers are interbonded is depicted by D. The relative amounts of the two fibers will quite obviously influence the void volume of the composite. The density of bonded points will affect structural flexibility and, where the bonded fibers are electrically conducting material, the conductivity of the composite. Where one fiber is non-porous, the relative number of the two fibers will determine the porosity of the composite. In short, from this oversimplified pictorial representation one can easily see how the final properties of the composite can be varied and one can appreciate that the properties of the composite can be a blend of the properties of dissimilar, normally incompatible materials - that is, the properties of the composite are themselves a composite of the properties of the materials forming the network. This attribute can not be stressed too highly since it is, if not unique, rarely found, difficult to achieve, and highly desirable for new materials.

SUMMARY OF THE INVENTION

The purpose of our invention is to provide as new materials composites formed from dissimilar fibers, composites whose physicochemical characteristics may be the resultant of the physicochemical characteristics of the dissimilar fibers present, whose physicochemical characteristics can be varied, and whose properties are under the control of the fabricator. An embodiment is an article comprising a network of a first fiber and at least one second fiber, where at least the first fiber has a plurality of bonded junctions at the first fiber crossing point. In a more specific embodiment each of the differing fibers is a metal. In another specific embodiment the first fiber is a metal and the second fiber has a surface area between 1.5 and about 1500 $m^2/g$. Yet another aspect of our invention is a method of making said composites. Other purposes and embodiments will be apparent from the description which follows.

BRIEF DESCRIPTION OF THE FIGURES

FIGS. 1 (a, b, c and d) are pictorial and non-literal overviews of the invention.

FIG. 6 is the same sample at higher magnification FIG. 7 is an electron photomicrograph of a composite of metal fibers with two different diameters having entrapped within the network a biosupport.

In FIG. 9 the metal fibers have a diameter of two microns, a length of five millimeters; in FIG. 10 the metal fibers have a diameter of 0.5 microns and a length of 0.1 millimeter.

DESCRIPTION OF THE INVENTION

Figure 2:
FIGS. 2 and 3 are electron photomicrographs at different magnifications of a composite of two different diameter stainless steel fibers; see Example 1.

We have found a generalized method of making shaped composite articles which is enormously versatile both with respect to the materials of the resulting composite as well as the shape of the resulting article. Our method bonds fibers at a plurality of their junctions in a fibrous network, which inter alia has the effect of imparting high strength and structural integrity to the fibrous network and to afford good electrical contact when one of the fibers is a metal or another type of conductive, or conductively coated, material. One result of our method is that it is possible to combine dissimilar materials with dissimilar properties where the materials and properties often are considered incompatible or mutually exclusive, and to obtain an article having mutually beneficial properties characteristic of each of the dissimilar materials.

Because of the broad operability of our method when applied to a wide spectrum of materials, we have examined the resulting articles of manufacture as to their properties, as to their several uses, and as to the variants which can be expected based on our experience. In one aspect, then, our invention is a generalized method of making shaped articles containing at least two kinds of fibers bonded in a network. In another aspect our invention is the various composites which result from the method of our invention. The lowest common denominator of these articles, that is, the feature which is common to each of them, is a network of at least two classes of fibers where the fibers from at least one of the classes are bonded at a multiplicity of junctions within the network. This theme will be elaborated upon in greater detail below.

We use the term "network" in the usual dictionary definition, i.e., a structure of [cords or wires] that cross at regular intervals and are knotted or secured at the crossing. See Webster's Seventh New Collegiate Dictionary, G. and C. Merriam Co., (1970), p. 568. We note that the networks of our invention are two dimensional in the sense that the flat-shaped article has a thickness which is small relative to other dimensions. However, the diameter of the largest size fiber also will be small relative to the thickness of the article, which means that the articles of our invention are not composed of a monolayer of fibers but instead are composed of multiple layers of discrete fibers. In the context of the definition of a network, the crossing points of the fibers may be in different planes, and it follows that the fibers will not be in contact at all crossing points. In this application "junctions" refers to the crossing points in the network where fibers are in contact or caused to come into contact.

As previously stated, the feature common to all articles of our invention is a network of at least two classes of fibers where at least one class is bonded at a plurality of their junctions. By "bonded" is meant that the fibers are physically connected, either directly or via a link or bridge between the fibers. In particular, "bonded" does not include mere physical contact of two fibers but rather requires some sort of permanent union or "gluing together" of the fibers; bonded fibers are securely connected, locked together. Note also that two fibers can be bonded without their being in direct physical contact, but with indirect contact provided by a link or bridge between them. Whether only the first fibers are bonded at their junctions or whether both the first and the second fibers are bonded at their junctions depends on the materials of the article, the bonding method, and the bonding conditions. Similarly, the question whether the first and second fibers are bonded to each other also depends on the fibrous materials, the bonding method, and bonding conditions. For example, where both the first and second fibers are of the same metal, then generally both the first fibers will be bonded to each other at their junctions and the second fibers will be bonded to each other at their junctions, as well as the first and second fibers being bonded to each other at their junctions. Where, for example, the second fiber is a metal which is dissimilar from that of the first fiber, and where the bonding method is sintering, then the question of whether the second fiber will be bonded at its junctions will be dependent upon sintering temperature and sintering time as well as the particular metal constituting the second fiber. Similar considerations apply to the question whether the first and second fibers will be bonded at their junctions. In contrast, where the first fiber is metal and the second fiber is, for example, a ceramic, the kind of bonding will be quite dependent upon the particular bonding method and bonding conditions. So, for example, where heating is the bonding method then at sufficiently high temperatures to sinter both the metal and the ceramic the first fiber will be bonded at its junctions and the second fiber bonded at its junctions, but generally there will be no bonding at the junctions of the metal and the ceramic.

On the other hand, where the first fiber is a metal and the second fiber a nonmetal, if electroplating is the bonding method and if the second fiber can be electroplated under the conditions employed, then there would be bonding at all junctions. Where only the metal is electroplated under the conditions used then only the junctions of the first fiber will be bonded. For example, electrodeposition of nickel onto or into the metal fibers in a network of 2 micron diameter stainless steel and 2 micron diameter carbon fibers causes a physical enlargement of the metal fiber diameters which leads to an increase in the electrical and physical contact between carbon and metal by greater than 30%. Such a procedure provides one example whereby bonding between dissimilar materials can be enhanced for desired electrical properties or other favorable mechanical attributes. In any event, the question of what junctions are bonded generally can be answered from a knowledge of the materials used, the bonding method and bonding conditions employed, and, in appropriate cases, through further simple experimentation.

Among the bonding methods which may be used in the practice of our invention are included heat, electroplating, chemical bond formation, chemical vapor deposition, plasma spraying, thermosetting, dipping and drying in a solution of an organic binder (i.e., structure forming agent; vide infra) and solvent, application of pressure to a mixed composite fiber network which flows, melds, creeps, etc., or any other procedure which causes physical attachment of all, or various types of selected, fibers within the network.

Heating may cause similar or dissimilar metals or ceramics to sinter via the atomistic diffusion of surface atoms so as to form solder-like joints which provide good electrical and/or mechanical contact. Alternatively, heating may cause dissimilar metals and materials to overcome diffusive or reactive energy barriers permitting surfaces of metalized or polymer-coated fibers to bond at conditions different, or significantly less severe, than those otherwise required to bond the base materials. The thermosetting properties of polymeric or noncrystalline materials may also be used to fuse these materials during an appropriate heat treatment with the simultaneous application of an applied pressure force.

Electrodeposition of a metal (electroplating) into or onto the mixed fiber composite provides a mechanism for growing or thickening and stregthening contacts which are present or formed between electrically conductive materials onto which the metal is deposited. It also provides a mechanism for increasing the electrical conductivity of the matrix, and, as noted earlier, conductor "swelling" during electrodeposition can increase the contact between conductive and nonconductive fiber materials. Alternatively, electroplating via electroless deposition from a metal salt and a suitable organic reducing agent can be used as an indiscriminate bonding procedure which is operative regardless of the base electrical conductivity of the material coated (e.g., aqueous silver nitrate plus formaldehyde produces a colloidal suspension of reduced metal which bonds via precipitation and forms adherent metallic films on various substrates).

Chemical vapor deposition and reactive plasma spraying provide well-documented means of growing thin-films and coatings which have the ability to coat, in a relatively uniform manner regardless of geometry, various articles despite their dissimilar electrical or mechanical properties. These procedures therefore have the ability to bond similar or dissimilar materials which are in relatively close proximity. Since the embodiment of this invention many times involves mixtures of microscopic fibers in intimate contact, the growth of a secondary deposit via, e.g., chemical vapor deposition, can cause physical attachment of fibrous materials at locations which had previously been in close proximity but not in direct physical contact. This is an example where two fibers are bonded via a bridge beteen them.

Dipping a composite fiber matrix in a solvated organic binder or resin can cause attachment of similar and dissimilar fibers when the solvent is removed by gradual drying and the binder is concentrated via surface tension effects at the interstices and intersections of the fibers (e.g., polyvinyl alcohol in water). Subsequent drying leads to the physical attachment of the fibers and high temperature carbonization or graphitization of the organic can be performed to make the interconnecting material electrically conductive. Alternatively, a solvated inorganic metal salt also can be deposited upon drying at the intersections of the fibers with this material being subsequently reduced to produce a conductive coating and physical attachment.

Still another method of attachment might involve an ambient temperature attachment of fibers through the application of pressure exceeding that required to cause the material to flow via plastic deformation. Such a process could be performed and/or facilitated via the addition of an organic fiber or through the use of a combined heat and pressure treatment.

In those cases where the first fiber is either a metal or a ceramic heating can be used effectively to sinter-fuse the fibers at their junctions. The sintering temperature and sintering times will vary greatly depending upon the nature of the materials to be fused as well as the nature of the second fiber, but these generally can be determined either via simple experimentation or through knowledge of the activation energy of the various processes which occur during sintering. For example, in the case where the first fiber is stainless steel and the second fiber is carbon and the sintering is done in the presence of hydrogen, then the competing reactions are fusion of the stainless steel and vaporization of carbon through reaction with hydrogen, especially if catalyzed by the metal. Experimentation has shown that the activation energy of the latter process is substantially less than that of the former. In addition, the latter process is dependent on hydrogen pressure. Therefore, the selectivity of sinter fusing the stainless steel at its junctions may be optimized by heating under low hydrogen partial pressure at relatively high temperatures for relatively short times.

The particular bonding method as well as the conditions of bonding will understandably depend upon the nature of the fiber materials in the composite as well as its intended use. For example, where the first fiber is a metal and the composite is intended for use as an electrode, where good electrical contact between the metal fibers is required, it is found that bonding via sintering is quite effective. However, it also has been found that bonding at the junctions is further improved by electroplating. The message we wish to convey is that however significant may be the bonding method in the general practice of our invention, the choice of the particular bonding method used necessarily depends upon the nature of the fibers in the composite as well as the intended use of the composite.

Perhaps the most important subclass of composites is that where the first fiber is a metal. Virtually any metal fiber may be used in the practice of our invention, although generally the metal must be chemically inert under the conditions of the contemplated use of the composite and also generally must provide structural integrity, strength, and mechanical stability to the final composite under the contemplated conditions of use. For example, the final composite generally needs to retain its overall shape and to remain relatively rigid and immobile in most uses. However, where the final composite needs to retain some flexibility in its operating environment then materials need to be chosen which will impart such properties. Examples of metal fibers which may be used in the practice of this invention include aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, berrylium, iridium, silicon, magnesium, manganese, gallium, and combinations of the above. Metal alloys also may be used in the practice of this invention, as exemplified by constantin, hastelloy, nichrome, inconel, monel, carpenter's metal, and various steels, especially stainless steels, and other alloys. As can be appreciated, there is enormous flexibility in the choice of metal fibers which adds to the attractiveness of our invention.

The diameter of the metal fibers used is largely dictated by their availability. Although in principle there is no upper or lower limit to metal fiber diameter, there may be operational restrictions in those cases where the second fiber is a non-metal which is held together by the fused metal network. For example, if the second fiber is a carbon fiber which is interwoven among fused metal fibers, then if the metal fiber diameter is greater than ten times, or less than one-tenth, the carbon fiber diameter the fused metal network may not hold the carbon fibers together adequately. But in the more general case the ratio of diameters of a metal first fiber to second fiber may range from as high as 1000 to as low as 0.001, depending upon the nature of the fibers, their density, and the intended use of the article inter alia. Another operational limitation may be related to the number of bonded junctions which are largely responsible for supporting, for example, the carbon fibers in the aforementioned composite. Calculations show that the number of such junctions varies inversely with the square of the metal fiber diameter, hence there is a requirement for small diameter metal fibers where it is desirable to increase the overall weight fraction of carbon of the resulting composite. But in the context of novel composites per se, the diameter of the metal fiber used is not critical. The method of preparation and attainment of the composite is not limited by metal fiber diameter, at least up to about 50 microns. Metal fibers with diameters as low as about 0.5 microns and with diameters up to at least 25 microns have been used quite successfully in the practice of our invention. It needs to be emphasized that the aforementioned range is merely illustrative of the success which is to be contemplated and is more representative of metal fiber availability rather than being a limitation on the diameter of metal fibers.

Where the first fiber is a metal, the second fiber may be a metal, a ceramic, carbon, a high surface area material, or any combination of the above. One important subclass of composites results from the second fiber being a metal. The metals which may be employed for the second fiber constitute the same group of metals as may be used for the first fiber as given above and need not be repeated here. The second fiber may be a metal which is the same as or different from that of the first fiber; that is, where the second fiber is a metal it is independently selected from the same group of metals from which the first fiber is chosen. Often the second fiber as a metal will be distinguished by having a diameter different from that of the first fiber. More particularly, relatively large diameter fibers in a network impart strength and structural integrity to the composites. On the other hand, a small diameter second fiber may be chosen to adjust the void volume and porosity of the resulting composite. Where the two metals used are of quite different diameter, it has the effect of constructing a small mesh network on a large mesh framework, which has been found to be a very useful structure. The second fiber may have a diameter ranging anywhere from about 0.001 that of the first fiber to 1000 times that of the first fiber. The second fiber may be present at a weight ratio of from about 0.001 to about 100 that of the first fiber. It should be clear that adjustment of both the weight ratio as well as the diameter of the second fiber enables one to control the porosity and void volume of the resulting composite almost without limitation and essentially continuously and enables one to fabricate articles customized for their intended use. The ratio of fiber length to fiber diameter, or aspect ratio, is yet another independent variable, and in the variant where both the first and second fibers are metals the aspect ratio of the second fiber can range between about 10 and about 10,000.

Figure 3:
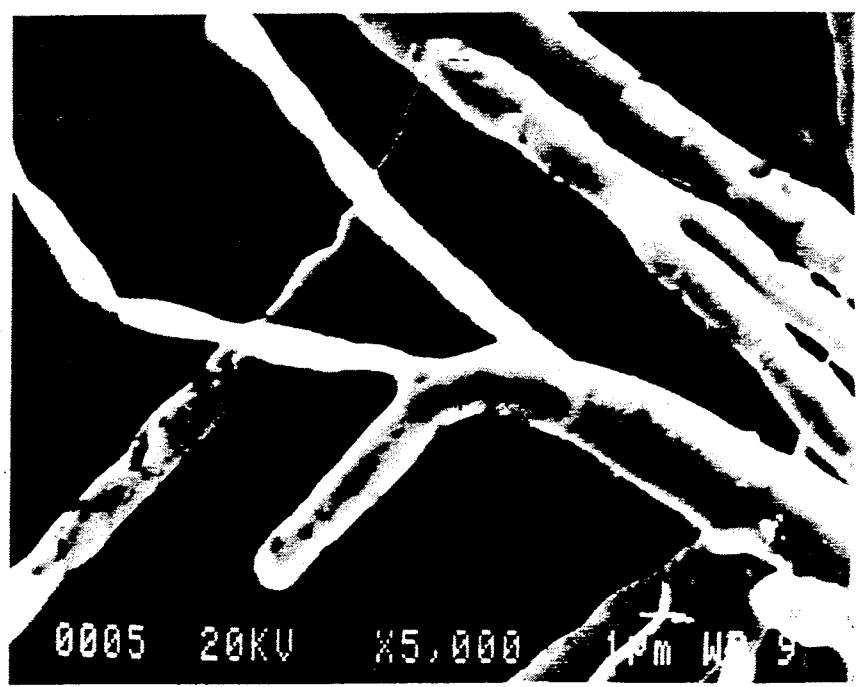

As shown in the electron micrographs of FIGS. 2 and 3, application of our invention has allowed us to create a composite, which in this case is an electrode structure, combining both a high void volume and a fine pore size distribution, normally considered to be mutually exclusive electrode properties. The composite of the figures in question is one of stainless steel fibers of two different diameters and lengths. If this composite were electroplated with nickel, or if an analogous composite were prepared from nickel fibers, and thereafter packed with Ni(OH)$_2$ via an electrochemical precipitation technique it would provide an ideal anode structure for the Ni-H$_2$ battery system. In this particular instance, the normally high internal resistance through the less conductive Ni(OH)$_2$ within the voids of a traditional nickel plaque anode is greatly decreased by the attachment of small electrical feed wires which penetrate within the voids formed by the larger nickel (or nickel-coated) fibers. The larger nickel (or nickel-coated) fibers are used for structural support of the smaller fibers and the full embodiment of this application of our invention entails that the complete electrode utilize fibers of at least two different diameters and aspect ratios. The finished electrode has lower mass, higher attainment of its theoretical capacity, greater cycle life, suffers less internal resistance and allows higher specific energy and power densities. The attributes of this electrode design are directly applicable to other battery systems such as Ni-Cd, Li-SOCl$_2$, Zn-air, etc. Cf. D. L. Britton, "Lightweight Fibrous Nickel Electrodes for Nickel-Hydrogen Batteries," NASA-TM-100958, 1988.

Composites where the framework is of a large diameter metal fiber upon which is constructed a mesh of smaller diameter metal fibers have a multiplicity of uses. For example, the void volume and pore size can be adjusted so as to provide an adjustable pressure drop. In the case of typical chemical upgrading and catalytic applications it may be desired to provide a maximum internal fiber surface area while minimizing pressure drop. In the case of controlled expansion systems needed, e.g., for automotive air bags, a material is desired which can provide Joule-Thompson cooling and controlled expansion of an explosive gas source at the time of an automotive collision. The composites of our invention may provide such a filter of reduced mass and cost and with the flexibility afforded by this invention.

In the case of superconducting magnetic separation materials or screens required for the beneficiation of coal, clay based pigments, etc., high void volumes or capacities, structural integrity (provided by larger fiber diameters) and high magnetic field gradients (provided by smaller fibers) are simultaneously required. In this instance the void volume and structural integrity required of the separator is provided by larger metallic fibers (e.g., 400 grade magnetic stainless steels may be used) while the interstitial regions of the voids formed by these larger fibers are filled with smaller fibers. The smaller radius of curvature of these interstitial fibers provides a greater magnetic field gradient so as to attract and retain magnetic impurities with greater force to the separator. In this instance the high void volume provides greater capacity of the separator prior to demagnetization and cleaning.

Figure 4:
FIG. 4 is an electron photomicrograph of a metal fiber composite entrapping fibers of 95% alumina-5% silica; see Example 2.
Figure 5:
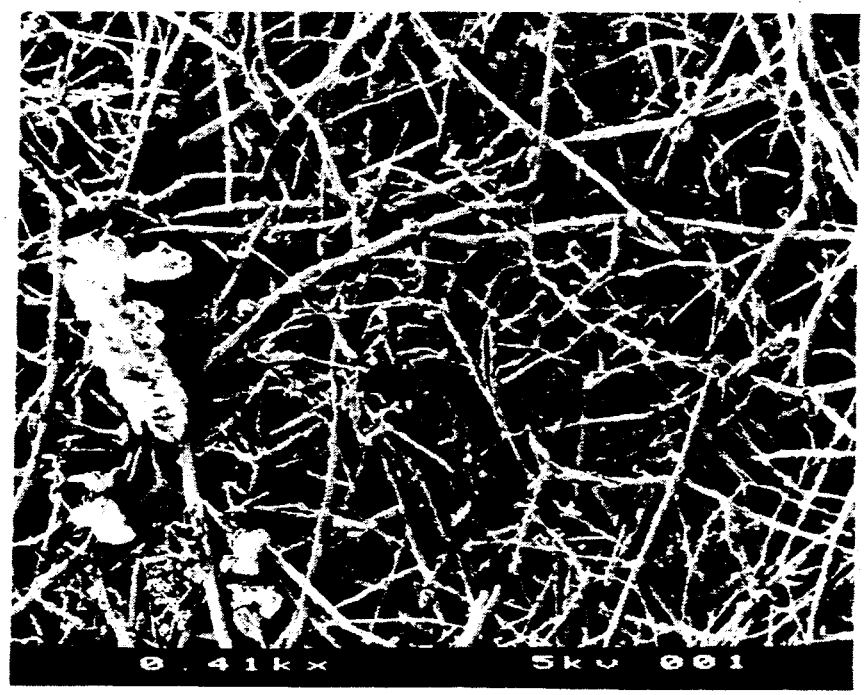
FIG. 5 is an electron photomicrograph of a metal fiber composite with an entrapped mica platelet and kaolinite particles chemically attached to the stainless steel fibers; see Example 3.

As another example, structures having metal fibers of differing diameter can be made with particles of a third material entrapped within its voids, especially where such third materials act as catalysts. Such composites may contain entrapped or entrained particles of carbon, zeolites, metals, non-zeolitic molecular sieves, silicas, aluminas, zirconias, magnesias, titanias, other metal oxides and mixed metal oxides of high specific surface area, ceramics, salts and/or other fibers of any of the above-noted materials. FIG. 4 shows a metal fiber matrix containing 95% alumina-5% silica fiber possessing a specific surface area of 150 m$^2$/g. FIG. 5 shows a mixed metal fiber matrix containing mica platelets entrapped within the matrix and kaolinites chemically attached to the stainless steel fibers through the surface iron impurities in the kaolinite particles. The size of the particles entrapped within the network is not a critical factor, although usually particle size is between about 0.1 and about 5000 microns.

FIG. 7 shows how particles can be entrapped or encapsulated within the network of the articles of this invention and how two different metallic fiber diameters assist in the entrapment of these particles. The material shown in FIG. 7 has entrapped particles of a commercial biosupport, although small particles of virtually any supported catalyst or catalyst support can substitute for the biosupport. In particular, the articles of our invention can entrap particles which are impregnated with a metal or metal compound having catalytic properties. The resulting material is flexible, can be layered, can be produced in a variety of shapes and sizes with graded porosities, is electrically conductive and has a low pressure drop compared to a packed bed. It therefore has many of the advantages of a fluidized bed including enhanced heat and mass transport and improved product control and selectivity, while being much easier to operate than a fluidized bed since the individual catalyst grains are firmly attached and cannot be entrained in the product stream at higher fluid flow rates through the bed. Since the extremely small catalyst particles can be entrapped within the structure, high effectiveness factors via reduced intraparticle mass transport limitations are obtained and overall loadings and costs of precious metal catalytic reactors can be greatly reduced.

Figure 8:
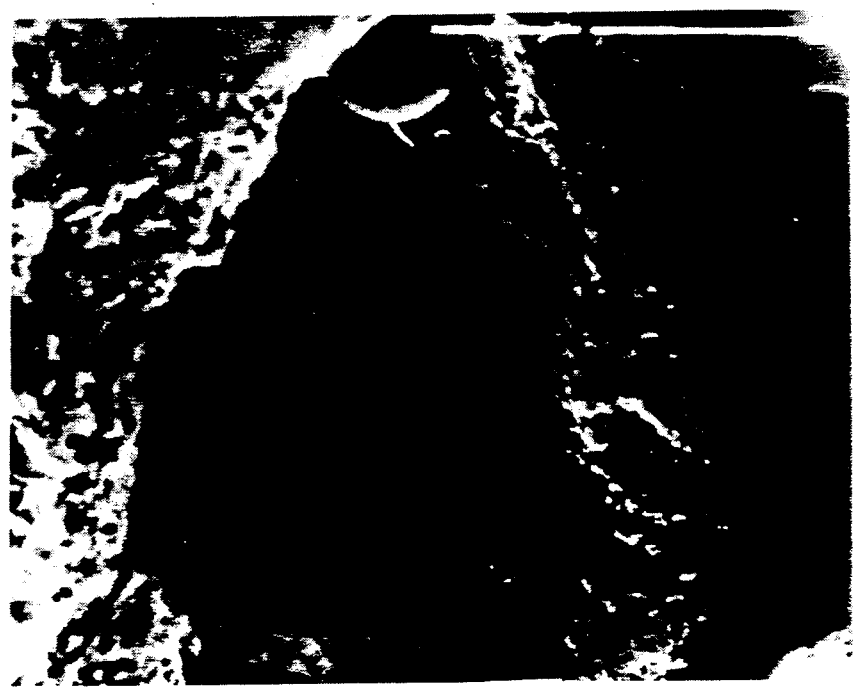
FIG. 8 is an electron photomicrograph of the same composite which has been impregnated with growing cells; see Example 4.

FIG. 8 shows the material of FIG. 7 which has been impregnated with growing cells. The material of this invention can thus function as a biosupport with many of the above noted mass transport advantages. Additionally, the electrical conductivity of the metal matrix allows coreactants such as oxygen to be generated internally through the electrolysis of aqueous electrolytes. Such procedures facilitate growth and production rates, and remove inerts such as nitrogen from the system when air is no longer pumped through the system, thereby reducing expensive pumping costs. The overall system shows a lower pressure drop than a packed bed, the flow direction can be readily reversed and the system is significantly more clog-resistant than a packed bed. Furthermore, it is expected that many cellular and enzymatic processes which are enhanced in an applied electric field can be greatly facilitated by the embodiment of the invention shown in FIGS. 6 and 7. If particles of a bioseparator or adsorbent are combined into the matrix, then very high conversions might be achieved in the absence of product and feed-back inhibition when the product is absorbed immediately after production within the matrix. Since many of the bioadsorbents are electrically activated, the unique conductivity aspects of the matrix provide a mechanism for discharging products from the matrix and operating the process in a cyclic fashion.

Since many biological processes are envisioned for space applications, the fixed nature of the biosupport particles and the ease with which a highly dispersed gaseous coreactant can be generated within the electrode appear to make this material unusually promising for applications in zero gravity. The ability to generate a gaseous coreactant within a matrix containing a traditional heterogeneous catalyst or electrocatalyst, as discussed above, is also applicable to the area of electroorganic synthesis and it is anticipated that this invention can provide many advantages to this area as well.

As mentioned previously, where the composite is to be used as, for example, an electrode and good electrical contact among the fibers is paramount, then the fibers may be electroplated to enhance such contact. This may be done both in cases where the first and second fibers are metals, as well as in those cases where the second fiber is not a metal, whether or not the second fiber is a conductor such as carbon.

Another important class of composites is that where the second fiber is not a metal but a high surface area material. Even though the minimum surface area needed is 1.5 $m^2g$, it is desirable that such second fibers have a surface area of at least 50 square meters per gram ($m^2/g$), although materials with a surface area greater than about 100 $m^2/g$ are preferred, and those with a surface area greater than 250 $m^2/g$ are particularly preferred. Among such high surface area materials available as fibers are included carbon, silica, magnesia, alumina, clays, titania, aluminosilicates, silicaaluminophosphates, aluminophosphates, and so forth.

In yet another important group of composites the second fiber is a ceramic material. For the purpose of this application a ceramic material is an oxide, nitride, or carbide of metals such as aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, berrylium, iridium, silicon, magnesium, manganese, gallium, and their mixtures. Specific examples of ceramics which may be used in our invention include silica, alumina, silica-aluminas, boron nitride, boron carbide, silicon nitride, silicon carbide, titanium nitride, titanium carbide, titanium boride, zirconium nitride, zirconium carbide, niobium carbide, niobium nitride, molybdenum nitride, molybdenum carbide, tungsten carbide, tantalum carbide, and so forth.

In a variant of our invention the second fiber is porous, for it then may be impregnated with a metal or a metal compound, especially one with catalytic properties for at least one chemical process. This variant is especially suitable where the second fiber has a relatively high surface area, as mentioned above, and normally will be practiced in that mode. As previously stated, any metal which exhibits suitable catalytic properties may be used and are illustrated by metals such as aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, berrylium, iridium, silicon, magnesium, manganese, and gallium, as well as their carbides, oxides, sulfides, nitrides, and combinations thereof. The porous second fiber may be impregnated by the metal or metal compound by any means known in the art. Such methods of impregnation include electrochemical precipitation, infiltration and drying, incipient wetness and drying, ion exchange, gas adsorption, liquid absorption, and vapor deposition. Methods of deposition are well known to those skilled in the catalytic art and need not be further elaborated upon.

The composites of our invention can be made by a relatively straightforward, uncomplicated method generally applicable to many types of materials. The fibers, and other components where present, are dispersed in a fluid medium along with an agent which we will refer to as a structure forming agent. The resulting dispersion is then cast into a predetermined shape and the cast dispersion is treated according to the various bonding methods discussed earlier so as to effect bonding of at least the first fibers at a plurality of their junctions. Much, and often substantially all, of the structure forming agent (if one is used) is then removed, often coincident with whatever procedure is used to effect bonding, but sometimes done sequentially, especially when the bonding procedure is followed by chemical or electrochemical leaching of the structure forming agent or pore former. As examples, residual materials can be removed through the use of an appropriate and selective etching organic acid; cores of electroplated carbon fibers can be removed via thermal oxidation, plasma oxidation, etc.; a ceramic particulate or void former can be preferentially removed by an appropriate caustic. Our method is extraordinarily flexible and broadly applicable as to the kinds of fibers which may be used in its practice. It also exhibits virtual universality as to the resulting shape, and in fact net shaped or near net shaped particles may be readily made. The method also manifests some versatility as to bonding methods, which affords great flexibility in processing procedures.

The fibers which may be used in this invention already have been adequately discussed, obviating the need for further description. These fibers are dispersed in a fluid medium along with other, optional solid and/or liquid components. These optional components are functionally significant in the final composite, becoming entrapped and enmeshed in the network, and occupying what otherwise would be the voids in the resulting composite. Examples of solid particulate components which may be used in the practice of this invention include zeolites, particulate catalysts generally, adsorbents, ceramics, and combinations thereof.

The fibers and other components, if any, are dispersed in a liquid by any suitable means. It is not essential to have a uniform dispersion, although often such uniformity is desirable. Dispersion may be effected by such means as sonication, agitation, ball milling, and so forth. The purpose of the liquid is merely to facilitate effective dispersion of the solids, especially where one wants as uniform a dispersion as is feasible in the final preform. Normally the liquid used will be unreactive with the other components of the dispersion, but one can envisage special cases where a functionally desirable reactive property of the medium may be advantageously combined with its fluidity. Since the liquid is later removed it is clear that it should be readily removable, as by volatilization. Water is normally a quite suitable liquid, although water-alcohol mixtures, and especially water-glycol mixtures, may be used. Illustrative examples of other liquids include methanol, ethanol, propanol, ethylene glycol, propylene glycol, butylene glycol, poly(ethylene glycol)(s), poly(propylene glycol)(s), and so forth. Other organic liquids also may be used, but normally without any advantages. Since water is by far the most economical and most universally available liquid it is the one of choice in the practice of our invention. The liquid medium also may contain salts where these are desirable, and the greater solubility of salts in water relative to organic media also make the use of water highly advantageous. While some mixtures of the above noted liquids are used to adjust the viscosity of the dispersion so that filtering or settling onto a screen or filter provides a certain degree of uniformity within the "wet" perform regardless of the densities and drag forces acting on the various particulates, still other additives including surfactants and dispersing agents can be used to assist in the mixing process and also to preferentially associate at least two of the solids with one another.

A preform is the solid containing a non-woven dispersion of the fibers and any other optional components either in the structure forming agent or located upon or within the pore volume of one or more of the fibers. The structure forming agent provides a solid matrix in which the fibers and optional components are dispersed. The purpose of the structure forming agent is to permit the fabrication of a solid preform of an otherwise structurally unstable dispersion of the elements of the final composite where the preform can be shaped, stored, and otherwise handled prior to creation of an interlocked network via bonding of at least the first fibers at their junctions. The structure forming agent merely provides a stable, although relatively weak, physical structure which maintains the spatial relationship of the components of the final composite prior to the latter's formation. Although the preform is only a temporary structure, it is an important one in the fabrication of the final composite. The structure forming agents used in the preparation of the preform also may contain adjuncts such as pore and void formers.

A short comment on terminology may be in order. What we have called "struture forming agent" is usually referred to as a "binding" in other contexts. However more descriptive and more familiar "binder" and "binding agent" may be, these terms might be confused with the particular notion of "bonding" essential to the description of this invention. It is solely to avoid such confusion that we adopt the somewhat awkward term "structure forming agent."

The structure forming agents may be chosen to volatilize at least to the extent of 90 weight percent, and sometimes to at least 99 weight percent, under conditions which are neither chemically nor physically detrimental to the fibers and other components in the final composite (but vide infra). Where the structure forming agent has no function in the composite its presence can be minimal. Among the structure forming agents which may be used in the practice of this invention are cellulose, organic resins such as polyvinyl alcohol, polyurethanes, and styrene-butadiene latex, and thermosets such as expoxies, urea-formaldehyde resins, melamine-formaldehyde resins, and polyamide-polyamine epichlorohydrin resins. Cellulose appears to be a quite desirable structure forming agent because it volatilizes completely at relatively low temperatures with little ash formation and is unreactive toward other components in the preform.

The structure forming agent is present in the preform at a range from about 2 to about 90 weight percent. The minimum amount of structure forming agent is that which is necessary to give a stable preform, that is, one which can be handled, shaped, and so forth, an amount which depends upon fiber loading, fiber size, and so forth. The amount of structure forming agent present in the preform will influence the void volume of the final composite, with the higher structure forming agent content affording a higher void volume, hence the structure forming agent can be used as one independent variable to control this property. We have previously noted that where two metal fibers are used with different fiber sizes, the amount of the smaller sized fiber also may be used to vary void volume and pore size. Using cellulose as a structure forming agent example, a range from about 10 to about 60 weight percent of cellulose is typical.

Figure 9:
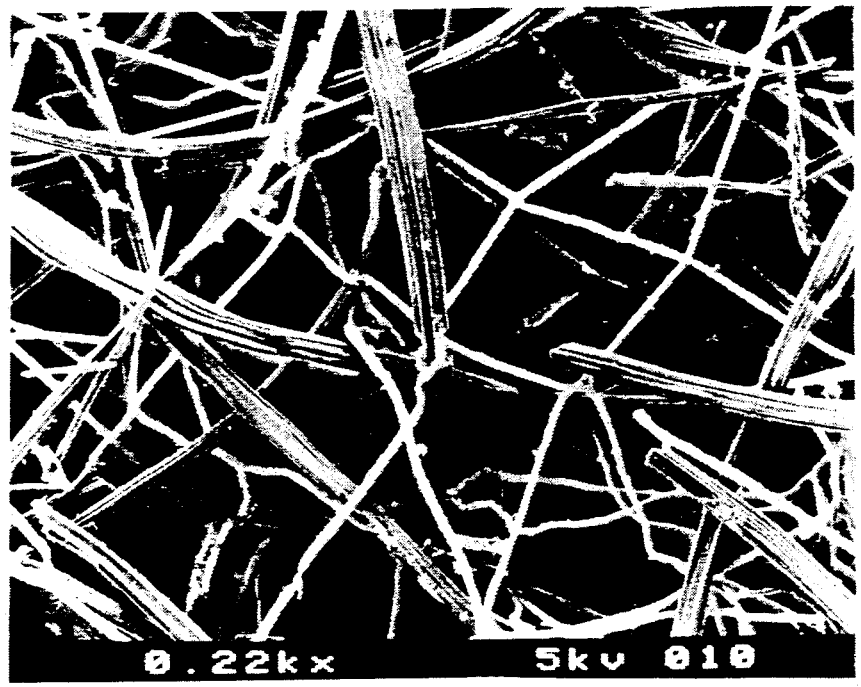
FIG. 9 is an electron photomicrograph of a composite of stainless steel and carbon fibers; see Example 5.

After the dispersion of fibers, optional components, and structure forming agent in a liquid is attained, the solids are collected, as on a mat. Excess liquid may be removed, such as by pressing, and the resulting solid dispersion often is dried, especially where it is to be stored prior to further treatment. Where a thermosetting structure forming agent is used, the temperature of drying is important. But in the more usual case there is nothing particularly critical in the drying process, and drying may be performed in air, under elevated temperatures, or in a flowing gas. The mass also may be compacted under pressure to a greater or lesser extent to effect void volume; the greater the compaction, the lower will be the void volume. This affords a third independent means of controlling void volume in the final composite. Still a fourth independent means of controlling the void volume and pore size can be affected by altering the tensile properties and aspect ratios of the fibers used. For example, FIGS. 8 and 9 are of composites prepared from identical paper preforms containing stainless steel fibers, carbon fibers and cellulose fibers in the relative weight ratios 0.5:1.0:0.5, respectively. In the case of FIG. 9, 2 micron diameter stainless steel fibers were used with a length of approximately 5 mm, whereas in the case of FIG. 10, 0.5 micron fibers were employed with an average length of 0.1 mm. As can be noted, the smaller diameter and shorter stainless steel fibers produce a sintered deposit or electrode with a significantly smaller void volume and pore size distribution.

The dispersion is cast into a predetermined shape prior to, coincident with, or after drying, with the last named procedure the one most commonly employed. The preform resulting from drying is generally quite flexible and adaptable to shapes of various sorts. Often it is quite convenient to cast the dispersion into sheets which can then be rolled up and stored prior to being treated to effect bonding. The sheets can be stored for long periods of time, can themselves be cast into near net-shaped bodies, and can be used for onsite bonding procedures for the fabrication of various articles. Various types of preform sheets may be stacked upon one another prior to any treatment to effect bonding in order to create thicker composites containing spatially graded compositions, graded porosities, nonconductive separator functions, etc. Alternatively, different shaped preform sheets may be stacked so as to form both two and three dimensional structures for various applications. Metal containing preforms can be, e.g., sintered onto thin metal foils which serve as liquid barriers in the case of bipolar electrode assemblies, or the metal foil may be omitted in the case of flow-through geometries More complex flow patterns and geometries are also obtainable as cellulosecontaining preform sheets can be shaped and glued into "corrugated cardboard" like structures prior to bonding treatment and have been shown to retain their shapes after such treatment.

The cast dispersion is treated principally to effect bonding of at least the first fiber junctions. The method used to effect bonding often has the important secondary or ancillary effect of removing the structure forming agent and the remainder of the liquid medium. The removal of the structure forming agent and the remainder of the liquid medium may be a second and discrete step which either precedes or succeeds bonding. For economy of exposition we will subsequently treat methods of bonding as effecting concurrent removal of the structure forming agent and remaining liquid, although it needs to be explicitly recognized that this is not necessarily the case.

Among the methods which may be used to bond at least the first fibers at their junctions may be mentioned heating, electroforming, electroplating, and various chemical reactions; the more complete exposition of bonding methods given earlier should be consulted. At least where bonding of metal junctions is sought to be effected, heating is the most effective bonding method and also has the desirable attribute of simultaneously effecting removal of some types of organic structure forming agents and the remaining liquid. Heating produces sintering of metal-metal junctions and also ceramic-ceramic junctions, but is not necessarily effective with other fibrous material. Another useful bonding method which may be employed is electroplating. Other methods of bonding have been described earlier.

Structure forming agents generally will be removed via methods which will include volatilization (both sublimation and evaporation), carbonization, other chemical reactions affording volatile products (or gasification generally), acid or caustic leaching, and dissolution, whether dissolution of the structure forming agent per se or of secondary products resulting from chemical degradation or transformation of the structure forming agent. Volatilization as by heating in a suitable atmosphere is the most general method of structure forming agent removal and is highly favored in the practice of our invention.

The foregoing description was couched in terms of a structure forming agent which was largely subsequently removed. In another large class of composites the structure forming agent need not be largely removed, and sometimes its removal is undesirable. For example, one may employ as a structure forming agent a polymer which subsequently undergoes carbonization but not volatilization. The resulting composite is then a network of bonded fibers in a graphitic matrix. As another example, in appropriate circumstances it is possible to have a solvated metal salt as a structure forming agent, which is later reduced to lock the structure together. What is important to recognize is that however important may be the class of structure forming agents which are largely removed by subsequent treatment it is not the sole class of structure forming agents which may be used in the practice of our invention.

APPLICATIONS

We have previously noted that the composites of our invention have many diverse uses, and in this section we elaborate upon several of such applications. It needs to be borne in mind that the applications described in this section are only illustrative examples of a large universe of uses and are not intended to be exhaustive or complete. Nor is the presence (or absence) in this section of a particular application meant to denote the relative importance of that application.

Liquid Double Layer Capacitors: High surface area conductive electrodes have been made (see FIGS. 8 and 9) which have the ability to store large amounts of electrical energy in the polarized double layer when such electrodes are immersed in a suitable liquid or solid electrolyte. Such energy can be readily retrieved as electrical energy upon demand depending upon the structure of the device and the physical properties of the materials and electrolytes employed.

Figure 11:
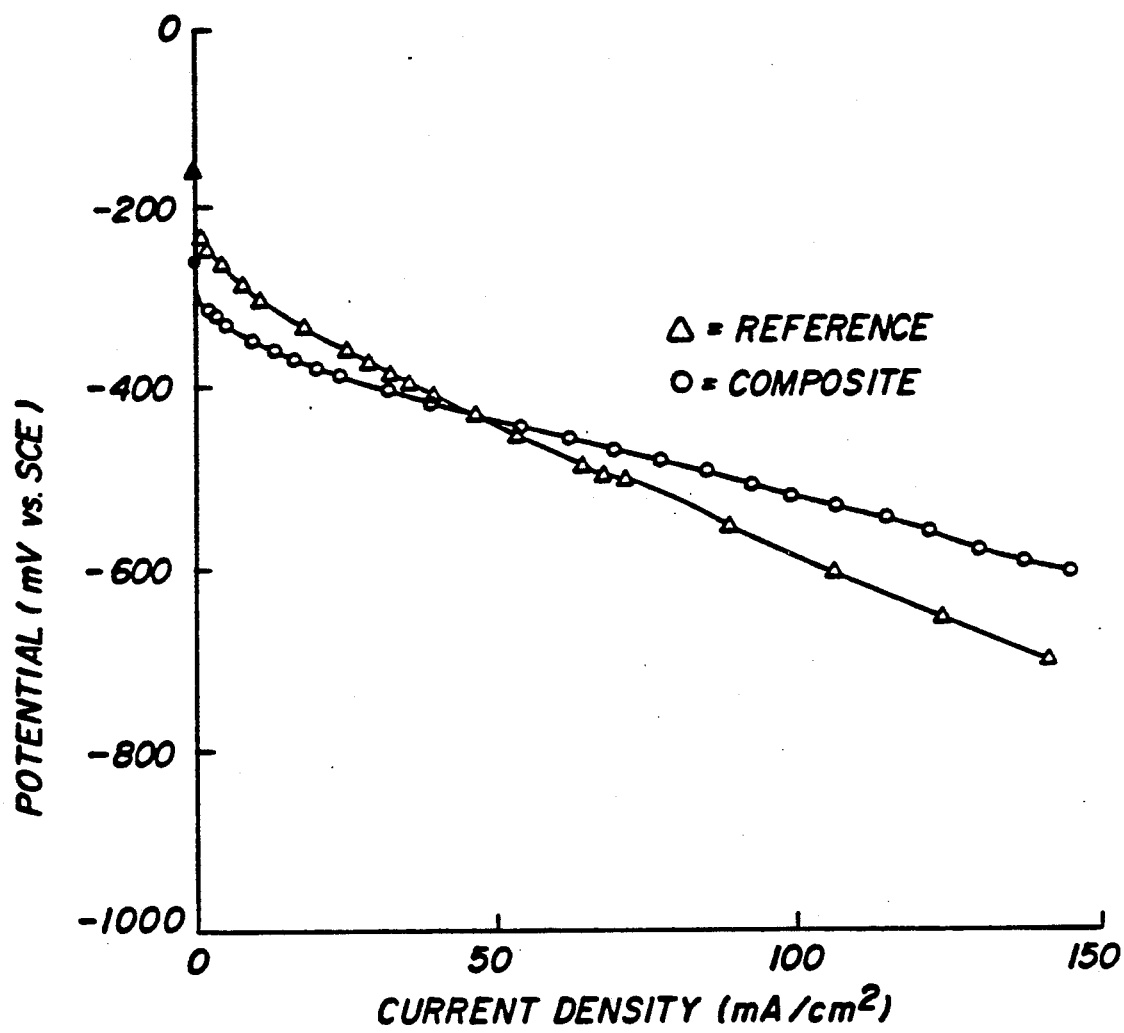
FIG. 11 shows polarization curves for the reduction of oxygen in an alkaline fuel cell; see Example 7.

Fuel Cells: High surface area fibrous structures are employed as fuel cell electrodes using liquid or solid electrolyte. In the case of liquid electrolytes, our invention allows a high porosity-high void volume structure to be created which assists heat and mass transfer at the electrode (i.e. fibers(s)) surface when electrolytes/reactants are transported through rather than over the electrode surface (i.e., flow direction is perpendicular rather than parallel to the sheet surface). Our electrode design, because of its fuzzy nature, also works better even when the flow direction is parallel to the sheet or stagnation flow exists. In general the performance enhancement results because our fibrous structure permits a self-supporting electrode to be created with high void volume so that the irregular channels retained in the structure permit ready electrolyte/reactant transport inside the structure. Traditional electrodes of lower void volume only employ the outermost regions of their structures to facilitate chemical reaction because of mass transport limitations. FIG. 11 shows a plot of how our electrode design outperforms a commercial fuel cell electrode even though our material weighs less and does not contain a precious metal catalyst! These data were collected under conditions of stagnation flow and even greater enhancements would be expected should we flow the electrolytes through our design. Incidentally, traditional electrodes cannot be used in a flow through design because of the associated pressure drop and low void volume.

In the case of solid polymer electrolytes, power density in hydrogen-oxygen fuel cells is restricted by the interfacial contact between the catalyst phase and the proton conducting membrane. In our invention, the catalyst is of a fuzzy nature which permits it to be hot pressed into the membrane at one end with the free ends of the fibers extending into the gas phase. When small platinum crystallites (ca. 2.0 nm) are affixed onto these fibers, hydrogen gas can be dissociated on the metal and the hydrogen atoms transported down the carbon fibers via surface diffusion/spillover into the membrane and toward the other electrode where they combine with oxygen to form water and electricity. The extension of the fuzzy surface into the gas phase assists transport of hydrogen atoms toward the other electrode just as high surface area grass blades assist the various metabolic processes which occur in the soil.

Batteries: Because our process allows us to create mechanically tough electrode structures, with high/adjustable void volumes utilizing an array of different materials, it is ideally suited for battery applications, particularly those where the power levels (i.e., the rate of discharge) is limited by solid products which can block access to the interior surface area of the electrode. For example, using normal electrodes Li-SOCl$_2$ batteries experience "cathodic clogging" at about 10 mA/cm$_2$. In test studies shown in Table 1 under Example 8, it is clear that the good mass transport and high void volume of our structures allows them to operate at somewhere between 15- and 27-fold higher current densities prior to clogging and loss in surface area. These advantages should also be available to many other battery systems where similar problems are encountered.

FIGS. 2 and 3 show a structure prepared of high void volume so that it can accommodate precipitates. Also, the use of a second smaller metal fiber allows us to electrically contact the precipitate within these voids when it is desired to discharge or recharge this electrode. Enhanced electrical contact means greater efficiency, reduced internal resistance, greater capacity, higher discharge rates, improved cycle life, etc. This improvement is required in Ni-Cd and in Ni-H$_2$ batteries, among others.

Hybrid Devices: These combine the attributes of fuel cells or batteries with the double layer capacitor. In other words, pulsed discharge of one of the former devices can give rise to big power surges when power is released from both the Faraday process as well as the energy stored in the double layer.

Filters and Separators: Our process provides a unique and inexpensive means for producing nonwoven articles of various materials and of high uniformity. The resulting composites are particularly well-suited as filter materials of various pore size. Also our composite can be made electrically conductive to assist separations of charged or polarizable species.

Bioseparations are typically performed by 5-20 nm pore size silica-alumina materials which selectively absorb proteins and other biological materials into their pore structures. Electric fields are known to greatly assist this separation on the basis of the charges and polarizabilities of these materials. One problem with silica-alumina materials is pressure drop in packed beds and the insulating nature of these separation materials. Since our process can combine metal fibers and particles of bioseparation materials, it has the ability to readily apply electric fields as well as separate particles for lower pressure drop and clog resistance. Flow fields can be easily reversed to unclog filters without washing away the separator, flow rates can be increased to reduced boundary layer diffusion resistance and electric fields can be turned on and off to release or entrain proteins as required.

There are numerous other types of electrosorption separation processes which can be accomplished with our material. Consider for example that carbon based materials among others can be used to selectively adsorb alcohols from complex mixtures. When these processes are performed in a packed bed the rate of separation and removal is limited by diffusion within the bed and boundary layer diffusion above the surface of the bed. In the case of our material a flow through approach is possible so that materials can be quickly absorbed or quickly released once the electric potential is removed. This advantage could be used to reduce the time and costs of separations. Alternatively, consider the merits of a process such as alcohol fermentation using a composite of our invention containing both immobilized yeast cells and an alcohol adsorbent. Not only can the electrolysis of water be used to provide oxygen to the yeast, but the products of reaction can be simultaneously absorbed so as to push the process toward much higher conversions than the living cells would normally tolerate. This is just one example of how a biological system could be pushed past its feedback inhibition point in terms of reaction selectivity. Other examples could also involve pushing reaction equilibria past equilibrium yields by selective electroabsorption of the product. There are a great many reaction systems where this approach would be applicable including many of those currently under development as part of membrane reaction systems.

The case of magnetic separation systems has already been described. Small fibers mean high magnetic gradients and strong attraction forces; large fibers mean higher void volumes, mechanical integrity and larger capacities prior to demagnetization and shaking. Therefore, our combination of small and large metallic fibers are meritorious for magnetic separations.

Heterogeneous Catalysts Supports: Our materials will provide low pressure drop, the attributes of a fluidized bed while the bed remains stationary regardless of fluid velocity, the ability to change fluid flow directions, high mass and heat transport rates, the ability to encapsulate particles of almost any supported or unsupported heterogeneous catalyst, the ability to use encapsulated materials as electrocatalysts because of the connecting wires, increases in the electrical conductivity of poorly conductive materials by virtue of the metallic fibers (i.e., new types of electrocatalyst support materials), high thermal stability depending on the constituent materials, the ability to provide the internal generation of some reactants via the electrolysis of an appropriate solvent, the ability to be cast in various shapes and sizes! The foregoing features, alone or in combination, are very attractive attributes for catalyst supports.

Bioelectrocatalysts: FIGS. 6 and 7 depict the situation as earlier described. In summary, the composites of this invention may be used to: (i) provide low pressure drops, (ii) immobilize cells in the absence of abrasion or wash-out from the reactor, (iii) provide higher local cell concentrations than available in a pure liquid system, (iv) entrap almost any biosupport, (v) provide internal generation of oxygen or other reactants via electrolysis of a solvent or electrolyte, (vi) provide high growth rates, production rates, reaction rates and enzymatic activities through electric field enhancements, (vii) provide clog resistance, (viii) provide simultaneous incorporation of a selective absorbent of a size exclusive or electrical nature, (ix) provide easy fabrication in various sizes, (x) provide the ability to change flow direction or increase flow velocity, (xi) carry out reactions in zero gravity environments where two phase flows, gas-liquid mixing and immobilization are all required and often prove difficult.

Sensors/Adsorbents: Carbon blacks are one of the most common types of adsorbent/absorbent/filter material employed. The high surface area carbon fibers when utilized in our process may be considered to be carbon black. Our process provides a composite ideally suited for absorbent applications which is well-packaged, has low pressure drop, etc., and which can be electrically characterized as a function of time. Since the electrical properties change with absorption, we can use the electrical characteristics to continually assess the state-of-health of the absorption material and determine its remaining capacity. This attribute makes our material well-suited to reducing costs and enhancing the logistics of systems which require filtration. For example, the military maintains a large supply of carbon black filter cartridges for chemical warfare applications which it periodically throws away or regenerates for logistical purposes. Obviously, a state-of-health indicator for the bed would be greatly appreciated.

Preforms for Advanced Composites: Since our material can be readily shaped prior to or during processing to effect bonding, it has the ability to provide nearnet-shape to fiber-reinforced composite preforms. Furthermore, our large choice of fibers adds a great deal of flexibility, while the nonwoven, 3-dimensional nature of our composite provides toughness in all three directions. In other words, delamination problems normally encountered with traditional carbon-carbon composites employing sheets of graphite fabric reinforcement can be reduced when our material is employed.

For applications requiring controlled interactions with microwaves, cloaking, EMP, RFI, EMI, etc., the conductivity and performance of resultant materials can be controlled by the composition of the fibers, their relative loadings, their aspect ratios, the conductivity and inter-connected nature of the preform, and so forth. The degree of flexibility offered by our process toward the above-noted material design goals is significant and not obtainable by other means.

Waste Water/Effluent Treatment: Many of the above-noted properties are directly applicable here including tailored pore size, secondary materials inclusion for various applications/benefits, low pressure drop/high throughputs, flow reversal, clog resistant, easy regeneration, generation of internal reactants via electrolysis ($Cl_2$, $O_2$, $H_2O_2$, etc.) creation of internal electric fields providing enhancements in growth, decomposition, filtration, separation, coalescence, etc., ability to fabricate in large scale quantities which are mechanically tough and flexible, and so on.

EXPERIMENTAL

The following description is representative of the preparation of the composites prepared within. Differences in materials, conditions, etc., will be indicated for the individual composites where appropriate.

Materials—The constituent materials employed during composite preparation included carbon fibers from Charcoal Cloth, Ltd., 316L stainless steel fibers from Bekaert Steel Wire Corp. and/or National Standard, cellulose fibers as a mixture of soft and hard woods, and 316L stainless steel foils from Arnold Engineering. Individual carbon fibers were 2-3 microns in diameter but were used in the form of 20 micron diameter bundles up to 5 mm in length containing ca. 30 individual fibers. Cellulose fibers were 20-30 microns in diameter and varied in length from 100 to 1000 microns. The stainless steel foils were 5 microns in thickness.

Fiber preparation—Before the various fiber materials could be combined into a paper preform, the carbon and stainless steel fibers required separation and dispersion into a slurry for easy mixing with other materials. In raw form, the carbon fibers were bundled and twisted into strands and woven into charcoal cloth. The "cloth" was dismantled into strands, then cut into 0.5 cm sections to allow for dispersion of individual fiber bundles in water. "As received" stainless steel fibers were coated with polyvinyl alcohol (PVA) type Mowiol 4-88, which was utilized during sizing and cutting prior to shipment. PVA was removed by repeated rinsing of these fibers in distilled water.

Formation of paper preform—Since physical mixtures of the fibers are not mechanically stable, cellulose fibers were employed as a binder to form paper preforms. The paper preforms used in composite preparation were processed according to TAPPI Standard 205 using Noran equipment. The pretreated fibers along with cellulose fibers were agitated at 50 Hz in 1 liter of water for five to twenty minutes. The dispersed fiber mixture was then collected on a sheet mold (200 cm$^2$) to form the wet paper composite preform. The preform was pressed at ca. 400 kN/m$^2$ and allowed to dry in air at room temperature.

Assembly of electrode preforms—The first fiber-second fiber-cellulose composite papers (i.e., paper preforms) and stainless steel foils were cut into circular disks with diameters of 13 and 19 mm respectively, and assembled by layers. In most cases, an optional 19 mm diameter sheet of stainless steel-cellulose paper preform was placed on top of each side of the composite structure to serve as a protective layer.

Sintering of electrode preforms—The layered electrode preform was placed between two quartz plates (20×30 mm), which were held in place by a quartz clip. The sample was placed in a controlled atmosphere quartz U-tube reactor (25 mm diameter) for heat treatment. The sintering reactor was equipped with flexible gas lines to facilitate movement of the reactor into and out of the vertical sintering furnace (Heviduty, 10 A, 1150 W). Sintering was preformed in a reducing atmosphere of $H_2$ with a flow rate of 10-100 cc/min (STP) and total pressure of 101 kPa. Gases were supplied by Liquid Air with purities of 99.995% for $H_2$. Gas flow was monitored using a Linde Model FM-4550 flow controller.

The feed gas mixture was passed over Cu turnings at ca. 500 K. to remove background CO, $CO_2$, $O_2$ and $H_2O$ and then passed through a molecular sieve trap immersed in a liquid $N_2$ trap to further remove background condensibles. The sintering reactor was passivated with feed gas for a minimum of three hours prior to reaction. The sintering furnace was preheated to 1423

K. prior to beginning each experiment. The reactor was then introduced into the furnace causing a rapid cooling of the furnace to ca. 1400 K. The experimental temperature was typically reached in 5–7 min followed by sintering at the desired temperature. The sintering reactor was quenched by rapidly removing it from the furnace.

EXAMPLE 1

A mixed-fiber composite was made from 2 $\mu$m diameter and 0.5 $\mu$m diameter 316 stainless steel (ss) fibers combined in equal weight fractions. The length of the 2 $\mu$m fibers added to the preform were 5 mm, the length of 0.5 $\mu$m fibers were ca. 100 $\mu$m. The electrodes of FIGS. 2 and 3 were prepared by casting a 16 cm diameter, circular preform sheet, using 0.5 g of 2 $\mu$m diameter 316 stainless steel fibers, 0.5 g of 0.5 $\mu$m diameter 316 stainless steel fibers, and 0.5 g of cellulose fibers. The fibers were mixed at 50 Hz agitation in 1 liter of water prior to settling onto a filtration screen. The preform sheet was pressed at 400 kN/m$^2$, dried in air for >24 hours and sinter bonded at 1323 K. for 20 minutes in 101 kPa of H$_2$.

EXAMPLE 2

The electrode of FIG. 4 was prepared by casting a 16 cm diameter circular preform sheet, 0.5 g of 2 $\mu$m diameter 316 stainless steel fibers, 0.5 g of 0.5 $\mu$m diameter 316 stainless steel fibers, 0.5 g of cellulose fibers and 0.5 g of a commercially available alumina-silica fiber, Saffil, obtained from ICI Chemicals. Saffil is 95% alumina and 5% silica, Saffil fibers are 3±1 $\mu$m in diameter and have a surface area of 150 m$^2$/g. The length of the 2 $\mu$m steel fibers was 5 mm, the length of the 0.5 $\mu$m ss fibers was 100 $\mu$m. The fibers were mixed at 50 Hz agitation in 1 liter of water prior to settling onto a filtration screen. The preform sheet was pressed at 400 kN/m$^2$, dried in air for >24 hours and sinter bonded at 1323 K. for 20 minutes in 101 kPa of pure H$_2$.

EXAMPLE 3

The composite of FIG. 5 was prepared by casting a 16 cm diameter circular preform sheet using 0.5 g of 2 $\mu$m diameter 316 stainless steel fibers, 0.5 g of 0.5 $\mu$m diameter 316 stainless steel fibers, 0.5 g of cellulose fibers, and 0.5 g of a filler clay for fibers (Kaolinite with mica particles; Hi White, available from Huber Clays Inc.) The length of the 2 $\mu$m ss fibers was 5 mm, the length of the 0.5 $\mu$m ss fibers was 100 $\mu$m. The preform sheet, prepared as described in the earlier examples, was pressed at 400 kN/m$^2$, dried in air for >24 hours and sinter bonded at 1323 K. for 20 minutes in 101 kPa of pure H$_2$.

EXAMPLE 4

The composite of FIGS. 6 and 7 were prepared by casting a 16 cm diameter, circular preform sheet, using 0.5 g of 2 $\mu$m diameter 316 stainless steel fibers, 1.0 g of 0.5 $\mu$m diameter 316 stainless steel fibers, 2.0 g of cellulose fibers and 2.5 g of a commercially available biosupport of calcined mullite known as Biofix available from English China Clays. The length of the 2 $\mu$m ss fibers was 5 mm, the length of the 0.5 $\mu$m ss fibers was 100 $\mu$m. The liquid used was water combined with a cationic retention aid obtained from Betz Paper Chemicals which assisted the biosupport in associating with the cellulose fibers while in an aqueous solution. The preform sheet was prepared, pressed, dried, and sintered as described in the prior example. FIG. 8 is a photomicrograph of material prepared by circulating a solution containing yeast cells through the composite described above. The cells shown in the Figure have become entrapped within the matrix and the resulting composite can now be used, for example, as an enzyme reactor, or for fermentation employing a steady-state cell population.

EXAMPLE 5

The composite of FIG. 9 was prepared by casting a 16 cm diameter circular preform sheet, using 0.5 g of 2 $\mu$m diameter 316 stainless steel fibers, 1.0 g of 2 $\mu$m diameter carbon fibers and 0.5 g of cellulose fibers. The length of the 2 $\mu$m ss fibers was 5 mm. The carbon fibers were cut to a length of 5 mm and had a surface area of ca. 800 m$^2$g. These fibers were left in the form of ca. 10 $\mu$m bundles containing ca. 30 fibers per bundle. The preform sheet was prepared, pressed, dried, and sintered as described in the prior example.

EXAMPLE 6

Figure 10:
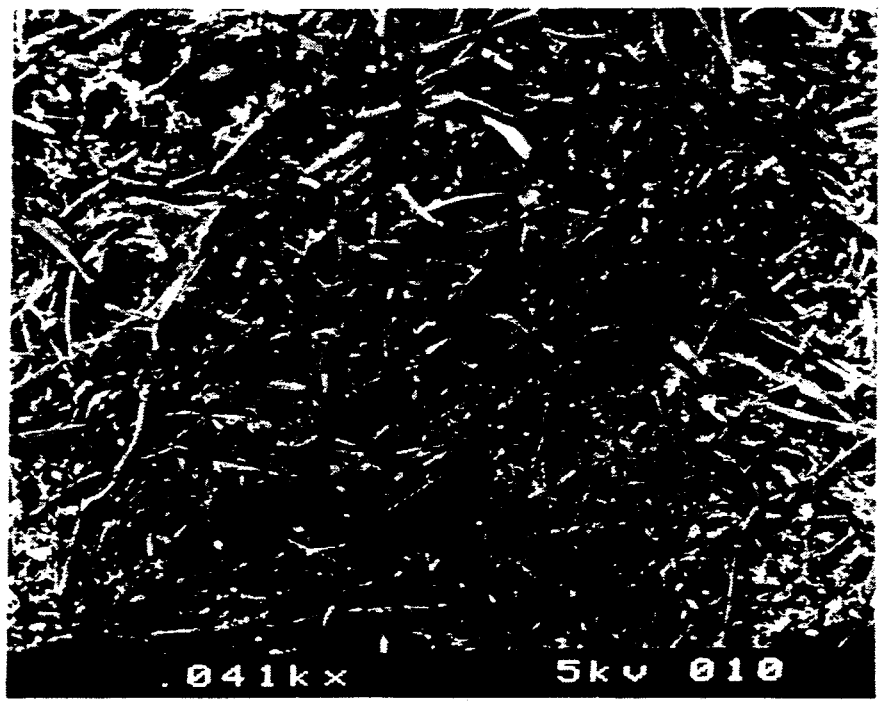
FIG. 10 is an electron photomicrograph of a composite of stainless steel and carbon fibers; see Example 6.

The composite of FIG. 10 was prepared by casting a 16 cm diameter circular preform sheet, using 0.5 g of 0.5 $\mu$m diameter 316 stainless steel fibers, 1.0 g of 2 $\mu$m diameter carbon fibers described in the prior example, and 0.5 g of cellulose fibers. The length of the 0.5 $\mu$m ss fibers was 1000 $\mu$m. The preform sheet was prepared, pressed, dried, and sintered as described in the prior example.

EXAMPLE 7

A commercially available electrode material, Prototech, available from Electrosynthesis Inc. of East Amherst, N.Y., was purchased as a 24 mg/cm$^2$ sheet containing 10 weight percent supported Pt crystallites and a porous Teflon separator material as a backing and used as the commercial reference.

Our material labeled as "Composite" was prepared by casting a 16 cm diameter, circular preform sheet, using 1.0 g of 2 $\mu$m diameter 316 stainless steel fibers, 1.0 g of 2 $\mu$m diameter carbon fibers and 0.5 g of cellulose fibers. The length of the 2 $\mu$m ss fibers was 5 mm. The preform sheet was prepared, pressed, dried, and sintered as described in the prior example.

To produce the electrode of FIG. 11, one piece of the preform sheet prepared above was cut into a 1.3 cm diameter circular piece and sandwiched between two 1.9 cm diameter pieces of a masking and protective preform which contained only stainless steel and cellulose fibers. The preform sheet for the latter pieces was prepared identically to the preform sheet for the active layer except that the carbon fiber bundles were omitted and the mass of stainless steel fibers and cellulose fibers per sheet were both 0.5 g. The resulting stack of three sandwiched preform pieces was sinter bonded at 1323K for 30 minutes in 101 kPa of pure H$_2$ to afford an article of density 16 mg/cm$^2$ which contained no Pt. The stainless steel layers on each side of the electrode served as a protective layer to protect the carbon-containing layer from any type of mechanical abrasion.

The data of FIG. 11 are a comparison of polarization data between our electrode and the commercial product. At low current densities the commercial product is superior. However, at higher current densities our electrode shows less polarization losses, even though our material does not contain Pt. The open structure of our material permits greater mass transport than the commercial material. The low void volume and porosity of the commercial product does not allow its active Pt materials to participate in the reaction at high reaction rates, whereas the inherent activity of the carbon, when accessible, is more than enough to overcome the presence of Pt at high reaction rates, as demonstrated by our electrode material.

EXAMPLE 8

The material described in Example 5 was subsequently electroplated with Ni from a $NiSO_4\text{-}6H_2O$ solution at the indicated current densities and times. The 21 weight percent carbon in the sintered electrode, rather than the expected 67% from the preform composition, reflects the fact that the preform was sintered onto a 316 ss foil and that some of the carbon was gasifed during sintering. Performance data are summarized in Table 1.

TABLE 1

| Nickel Electrodeposition into Composite Electrode | |
|---|---|
| Amount of Carbon in Composite electrode: | 0.00582 gm (20% carbon by weight) |
| Geometric Electrode area: | 1.27 cm$^2$ |
| Plating Solution: | 0.2 M $NiSO_4.6H_2O$ |
| Counter Electrode: | Platinum mesh |
| Reference electrode: | SCE |

| Applied Current Density (mA/cm$^2$) | Time Held (mins) | Total Voltammetric Charge (coul/gm) |
|---|---|---|
| — | — | 1.79 |
| 27.6 | 10 | 2.61 |
| 55.1 | 5 | 2.80 |
| 78.7 | 5 | 2.90 |
| 157.5 | 6.7 | 2.85 |
| 236.0 | 6.7 | 0.395 |
| 275.0 | 6.7 | 0.347 |

The column marked "Total Voltammetric Charge" (coul/gm) is based on the weight of carbon only and does not include contributions from the ss foil or ss fibers. The increasing values in this column indicate how electrodeposition initially causes greater contact between carbon and ss, while at higher current densities and longer times the decrease is due to a blockage of the active material by a nickel overlayer, with a sharp decrease in charge occurring at an applied current density over about 160 mA/cm$^2$. Overall, this material functions at between 15 to 27 times higher current densities than current commercial cathodes.

What is claimed is:

1. An article comprising a network of a first metal fiber and at least one second fiber, where the second fiber is selected from the group consisting of a ceramic, a high surface area non-metallic material, carbon, or any combination thereof, where at least said first metal fiber has a plurality of bonded junctions at the first metal fiber crossing points, and where the second fiber is interlocked in the network of the bonded metal fibers.

2. The article of claim 1 where the second fiber is a ceramic selected from the group consisting of the oxides, carbides, and nitrides of aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, berrylium, iridium, silicon, magnesium, manganese, and gallium and mixtures thereof.

3. The article of claim 1 where the first fiber is a metal, or any combination of metals, selected from the group consisting of aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, berryllium, iridium, silicon, magnesium, manganese, gallium, and their alloys.

4. The article of claim 1 further characterized in having entrapped within the network particles whose size is between about 0.1 to about 5,000 microns and where said particles are impregnated with a metal or metal compound having catalytic properties.

5. The article of claim 1 where the second fiber is a high surface area material with a surface area from 1.5 to about 1500 square meters per gram.

6. The article of claim 5 where the fiber is selected from the group consisting of silica, carbon, magnesia, alumina, titania, aluminosilicates, aluminophosphates, silicaaluminophosphates, and clays.

7. The article of claim 5 where the second fiber has a surface area of at least 50 square meters per gram.

8. The article of claim 5 where at least the second fiber is impregnated with a third metal or a compound thereof, said third metal selected from the group consisting of aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, berrylium, iridium, silicon, magnesium, manganese, and gallium.

* * * * *